United States Patent
Beuerle

[11] Patent Number: 6,015,180
[45] Date of Patent: Jan. 18, 2000

[54] ANCHOR SYSTEM FOR A SUN SCREEN ON A WINDSHIELD OF A MOTOR HOME

[76] Inventor: Guenther Beuerle, 3840 Graines Ct., Winterhaven, Fla. 33884

[21] Appl. No.: 09/263,199

[22] Filed: Mar. 5, 1999

[51] Int. Cl.[7] .................................................. B60J 1/20
[52] U.S. Cl. ..................... 296/95.1; 296/97.7; 150/168; 160/370.21
[58] Field of Search ................... 296/95.1, 97.7, 296/97.1, 97.3, 97.9; 160/370.21; 150/168, 166

[56] References Cited

U.S. PATENT DOCUMENTS

| | | | |
|---|---|---|---|
| 2,065,242 | 12/1936 | Omerly, Jr. | 296/95.1 |
| 2,489,901 | 11/1949 | Kocinski | 296/95.1 |
| 2,588,169 | 6/1952 | Lunt | 296/95.1 |
| 2,723,714 | 11/1955 | Moore | 296/95.1 |
| 2,823,746 | 2/1958 | Morgan | 296/95.1 |
| 3,874,437 | 4/1975 | Black | 296/95.1 X |
| 4,290,640 | 9/1981 | Dalton | 296/95.1 |
| 4,597,608 | 7/1986 | Duffy | 296/95.1 |
| 4,726,406 | 2/1988 | Weatherspoon | 296/95.1 |
| 5,035,460 | 7/1991 | Huang | 296/97.7 |
| 5,123,468 | 6/1992 | Mater, Jr. | 296/95.1 |
| 5,292,167 | 3/1994 | Hellman | 296/95.1 |
| 5,409,286 | 4/1995 | Huang | 296/95.1 |
| 5,441,095 | 8/1995 | Trethewey | 296/95.1 |
| 5,445,428 | 8/1995 | Yung-Sung . | |
| 5,564,770 | 10/1996 | Smith et al. | 296/95.1 |
| 5,615,923 | 4/1997 | Madison | 296/95.1 |
| 5,639,524 | 6/1997 | Lin | 296/97.7 |
| 5,816,641 | 10/1998 | Chen | 296/95.1 |

FOREIGN PATENT DOCUMENTS

| | | | |
|---|---|---|---|
| 1580155 | 9/1969 | France | 296/95.1 |
| 2740790 | 3/1979 | Germany | 296/95.1 |
| 446087 | 3/1968 | Switzerland | 296/95.1 |

*Primary Examiner*—Joseph D. Pape
*Assistant Examiner*—Kiran Patel
*Attorney, Agent, or Firm*—Terrance L. Siemens

[57] ABSTRACT

An anchor system for a sun screen on a windshield of a motor home comprising a sun screen to fit across the windshield of the motor home. An anchoring strap is for securing midpoints on opposite vertical edges of the sun screen to locations at opposite sides of the motor home by a person standing on the ground.

4 Claims, 6 Drawing Sheets

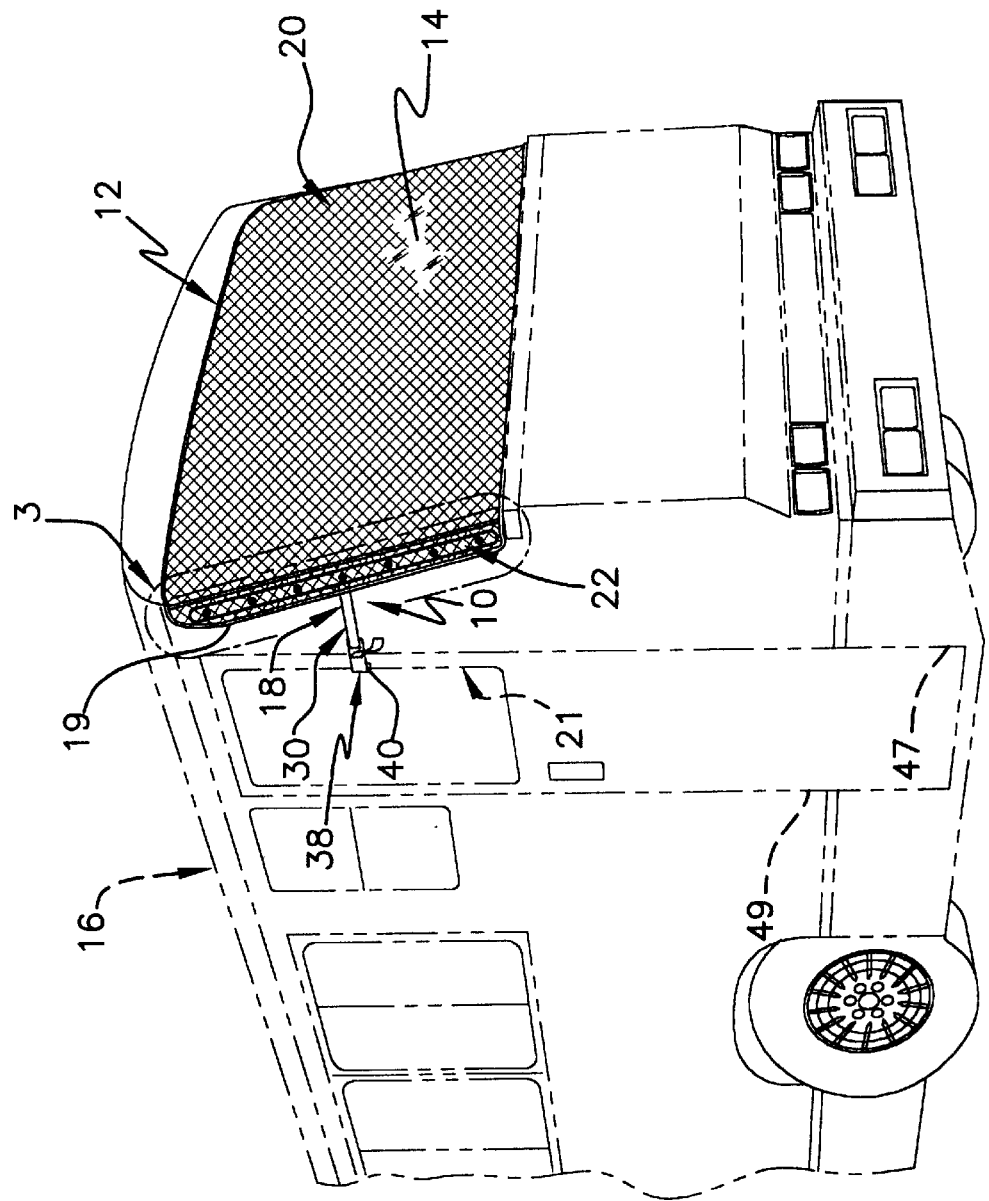

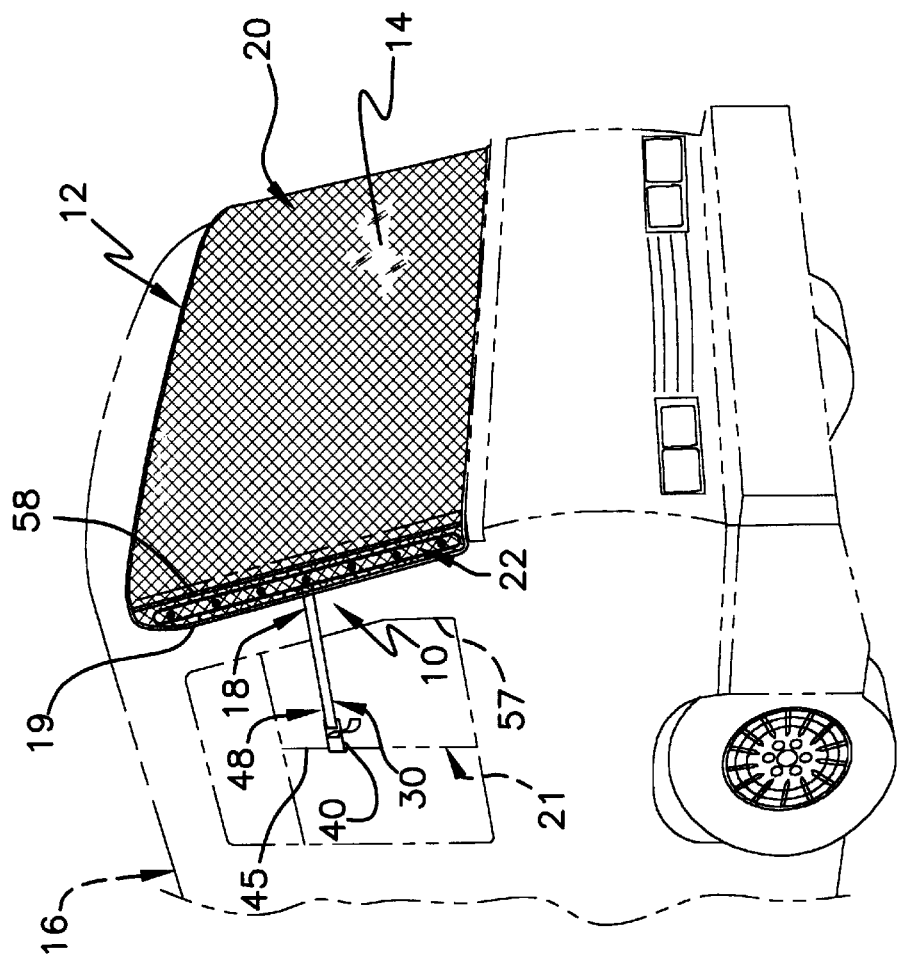
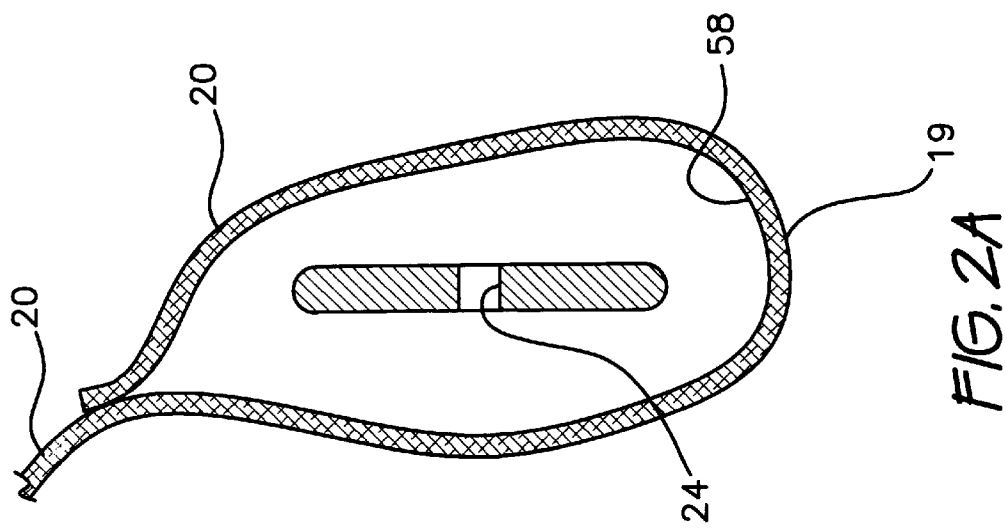

6,015,180

ANCHOR SYSTEM FOR A SUN SCREEN ON A WINDSHIELD OF A MOTOR HOME

BACKGROUND OF THE INVENTION

1. Field of the Invention

The present invention relates generally to window protectors. More particularly, the invention comprises an anchor system for a sun screen on a windshield of a motor home.

In general, a first field of use of the disclosed invention is by motor home owners as the most likely benefactors of the unique advantages of the instant invention. However, many other fields, such as bus and truck companies, could find potentially beneficial uses of this invention.

Thus, it can be seen that the potential fields of use for this invention are myriad and the particular preferred embodiments described herein is in no way meant to limit the use of the invention to the particular field chosen for exposition of the details of the invention.

A comprehensive listing of all the possible fields to which this invention may be applied is limited only by the imagination and is, therefore, not provided herein. Some of the more obvious applications are mentioned in the interest of providing a full and complete disclosure of the unique properties of this previously unknown general purpose article of manufacture. It is to be understood from the outset that the scope of this invention is not limited to these fields or to the specific examples of potential uses presented herein.

2. Description of the Prior Art

Attempts have been made in the prior art to devise window protectors. These window protectors are used to protect the interior of motor vehicles from the rays of sunlight. The window protectors are mounted to the exterior or interior surfaces of the windows of the motor vehicles.

Window protectors are shown in U.S. Pat. No. 5,035,460, issued to En L. Huang on Jul. 30, 1991, U.S. Pat. No. 5,445,428, issued to Chuang Yung-Sung on Aug. 29, 1995, U.S. Pat. No. 5,615,923, issued to Donald T. Madison on Apr. 1, 1997 and U.S. Pat. No. 5,639,524, issued to Frederick Tsun-te Lin on Jun. 17,1997.

U.S. Pat. No. 5,035,460 to Huang discloses an automobile window protector. A substantially planar, generally rectangular sheet of flexible material is held in an open configuration by a curved strip of spring-like material attached to the sheet. At or near each corner of the sheet is attached a strip having a connector of some sort at its distal end to facilitate attachment to an automobile. The present invention is completely different than this patent, in that it consists of a kit for anchoring an existing or new sun screen onto a windshield of a motor home by utilizing a vehicle door or window frame as an attachment point.

U.S. Pat. No. 5,445,428 to Yung-Sung discloses an adjustable sunshade. The adjustable sunshade is mounted to an inner surface of a windshield and can be adjusted to fit across the windshield of any of a variety of automobiles. The present invention is completely different than this patent, in that it consists of a kit for anchoring an existing or new sun screen onto a windshield of a motor home by utilizing a vehicle door or window frame as an attachment point.

U.S. Pat. No. 5,615,923 to Madison discloses a cover for a vehicle window. The cover has a locking strap feature to prevent theft. It is made in a variety of adjustable sizes to fit different types of motor vehicles to protect interior and exterior components from hot and cold temperature damage. The present invention is completely different than this patent, in that it consists of a kit for anchoring an existing or new sun screen onto a windshield of a motor home by utilizing a vehicle door or window frame as an attachment point.

U.S. Pat. No. 5,639,524 to Lin discloses ray-shield sheets for glass surface advertisement and art exhibition. A light sheet with means of easy mounting and detachment capabilities onto or from a surface of a window or windshield. The sheets do not appear ugly in appearance when installed, thus fulfilling the purpose of advertisement or neatness as an art exhibition. It can also act as a sun shield and heat inhibitive or conservation media. The present invention is completely different than this patent, in that it consists of a kit for anchoring an existing or new sun screen onto a windshield of a motor home by utilizing a vehicle door or window frame as an attachment point.

None of the above inventions and patents, taken either singly or in combination, is seen to describe the instant invention as claimed.

SUMMARY OF THE INVENTION

The present invention is an anchor system for a sun screen on a windshield of a motor home that consists of a kit for anchoring an existing or new sun screen onto the windshield of the motor home by utilizing a vehicle door or window frame as an attachment point.

Accordingly, it is a principal object of the invention to provide an anchor system for a sun screen on a windshield of a motor home that will overcome the shortcomings of the prior art devices.

Another object of the invention is to provide an anchor system for a sun screen on a windshield of a motor home that can be quickly and safely affixed to an existing or new motor home windshield sun screen by a person standing on the ground without the need of using cumbersome and dangerous ladders or stools.

An additional object of the invention is to provide an anchor system for a sun screen on a windshield of a motor home in which logos or names can be imprinted across the sun screen by stencil or template application for advertisement purposes before installed upon the windshield of the motor home.

A further object of the invention is to provide an anchor system for a sun screen on a windshield of a motor home that is simple and easy to use.

A still further object of the invention is to provide an anchor system for a sun screen on a windshield of a motor home that is economical to manufacture.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 1 is a perspective view of a forward portion of a bus style front door motor home with the present invention hooked to the front door.

FIG. 2 is a perspective view of a forward portion of a center door motor home with the present invention hooked to the side window frame.

FIG. 2A is a cross sectional view taken along line 2A—2A in FIG. 2.

DETAILED DESCRIPTION OF THE PREFERRED EMBODIMENTS

Figure 5:
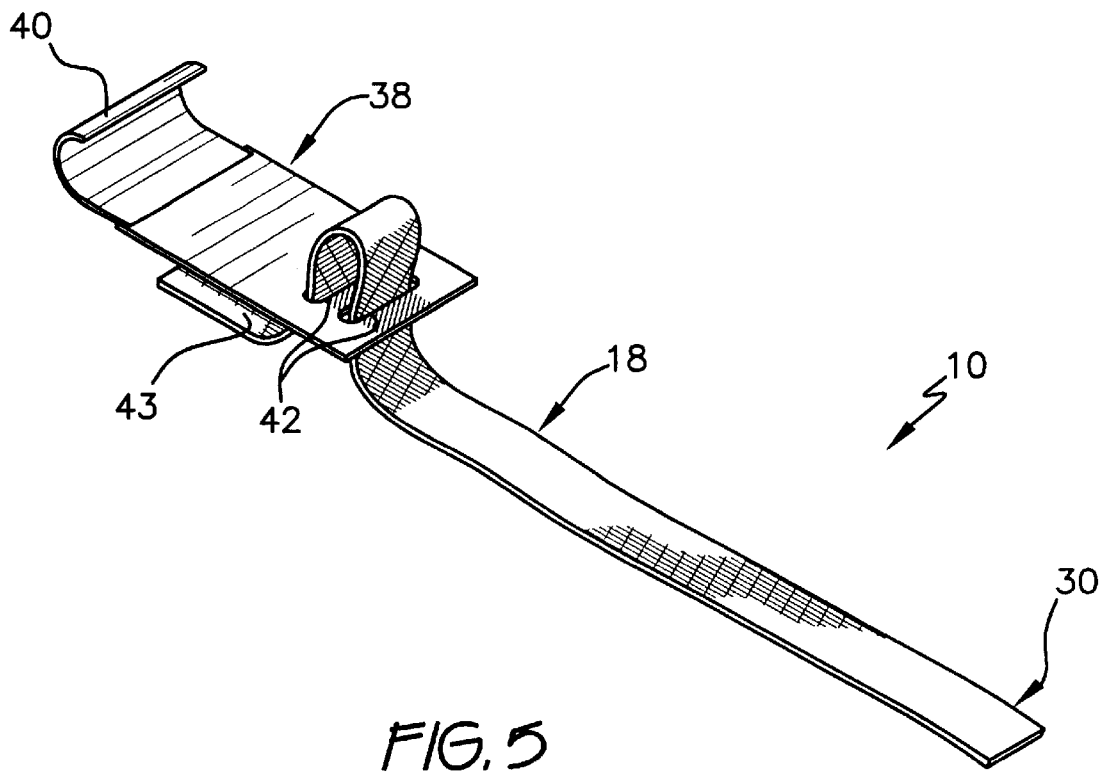
FIG. 5 is a perspective view showing one hook plate being engaged by a free end of one anchor strap.
Figure 3:
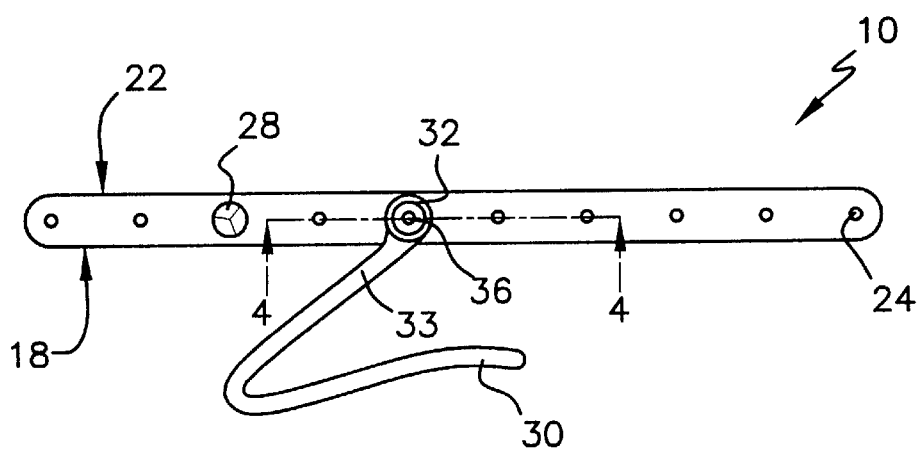
FIG. 3 is an enlarged plan view of an area of FIG. 1 as indicated by arrow 3.
Figure 4:
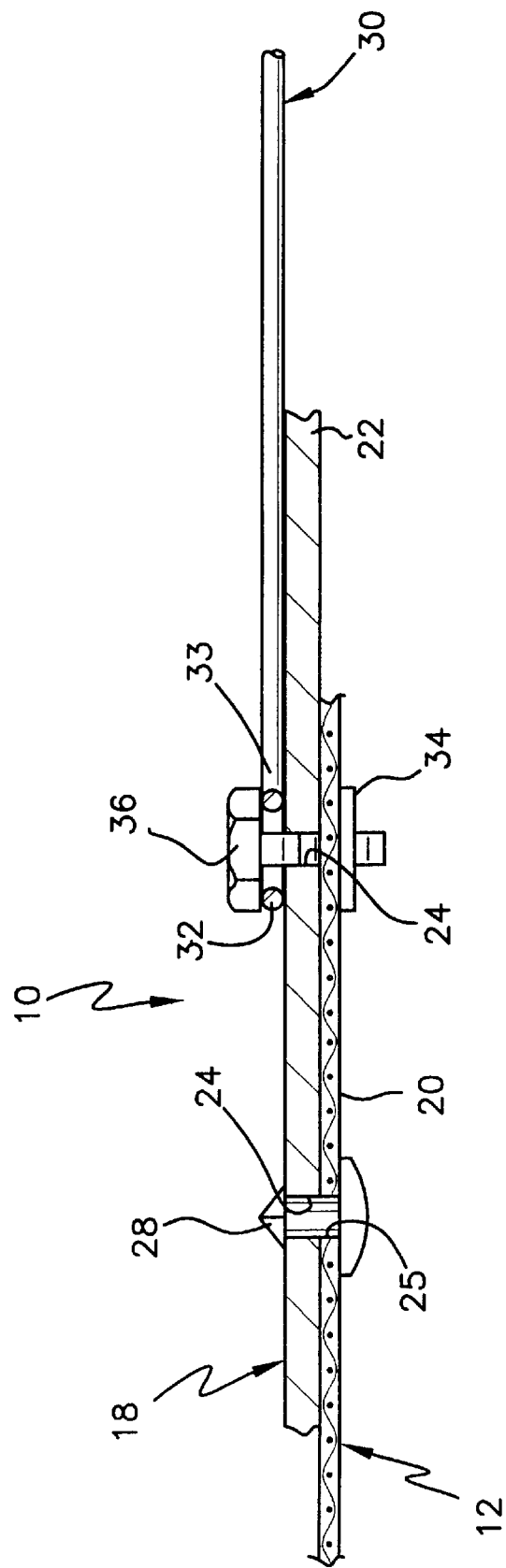
FIG. 4 is an enlarged cross sectional view taken generally along line 4—4 in FIG. 3.
Figure 6:
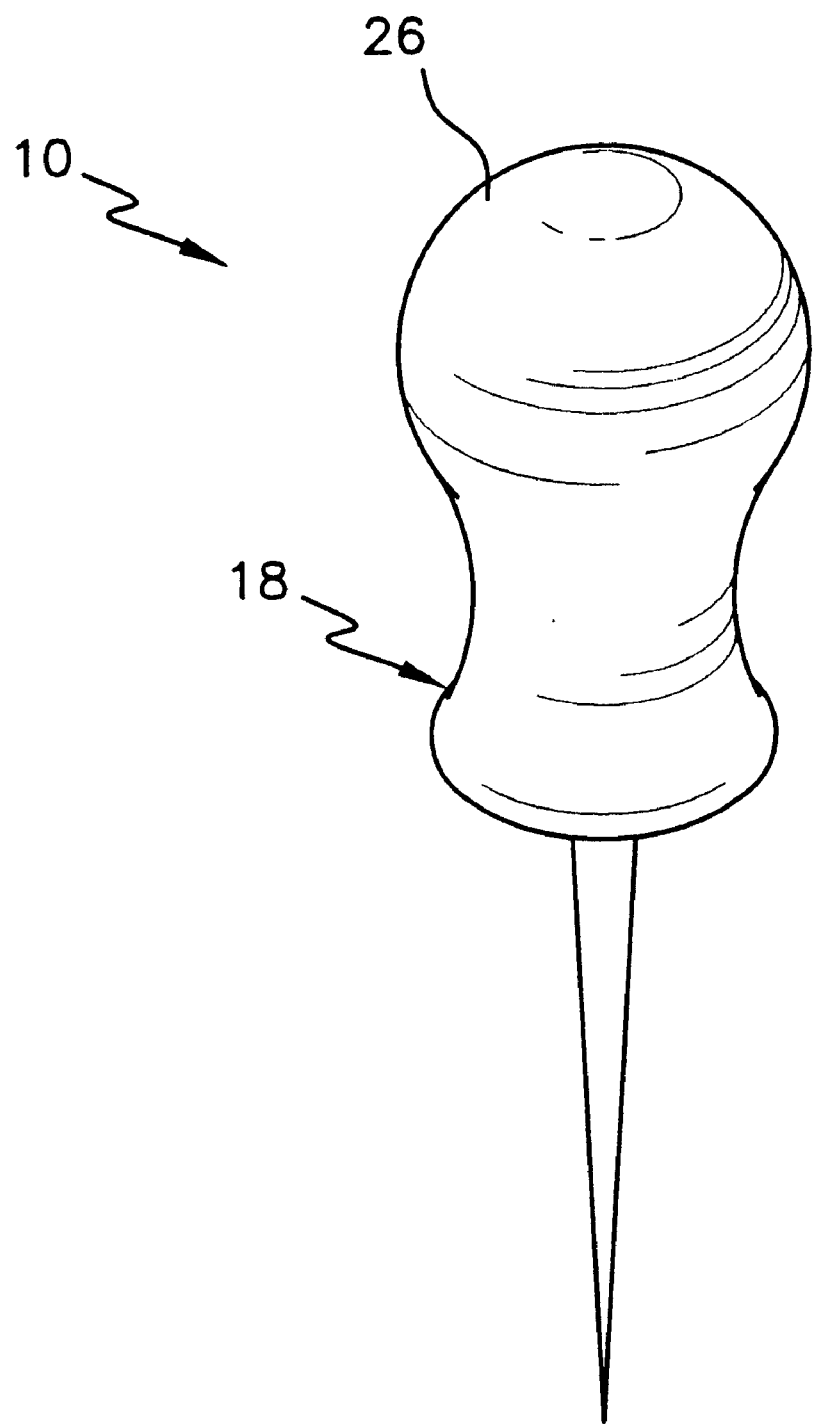
FIG. 6 is a perspective view of the awl.

Turning now descriptively to the drawings, in which similar reference characters denote similar elements throughout the several views, FIGS. 1 through 9 illustrate the various components of the present invention being an anchor system 10 for a sun screen 12 on a windshield 14 of a motor home 16 comprising sun screen 12 to fit across windshield 14 of motor home 16. A securing means 18 is for securing midpoints on opposite vertical edges 19 of sun screen 12 to locations 21 at opposite sides of motor home 16 by a person standing on the ground.

Sun screen 12 in FIG. 1 is an existing sun screen being a flexible sheet 20 having a series of snaps along each opposite vertical edge 19 to engage with mating snaps on the motor home 16. Although there are two opposed vertical edges 19, description will proceed with reference to one edge 19, it being understood that the other edge 19 is substantially similar. Securing means 18 includes a pair of anchor bars 22 having a series of spaced apart apertures 24. Each anchor bar 22 is stuff and straight, and positioned along one vertical edge 19 of flexible sheet 20 behind the snaps. As seen in FIG. 1, anchor bar 22 extends along vertical edge 19 for substantially the full length thereof. An awl 26 shown in FIG. 6, makes holes 25 through flexible sheet 20 via apertures 24 in each anchor bar 22. A plurality of anchor pins 28 are for insertion through all of apertures 24 in anchor bars 22 and flexible sheet 20, except midpoint apertures 24. A pair of anchor straps 30 are provided, in which each has an eyelet 32 on a first end 33. A pair of nuts 34 and bolts 36 are provided. Each nut 34 and bolt 36 can retain each eyelet 32 on each anchor strap 30 through midpoint aperture 24 on each anchor bar 22 and through flexible sheet 20 (see FIGS. 3 and 4). A pair of hook plates 38 are provided (see FIG. 5). Each hook plate 38 has an angled hook end 40 and a pair of slots 42. The pair of slots 42 in each hook plate 38 can engage with a free second end 43 of each anchor strap 30 with angled hook end 40 in engagement with the location 21 being a side window frame 45 of motor home 16 (see FIG. 2).

Figures 7, 8:
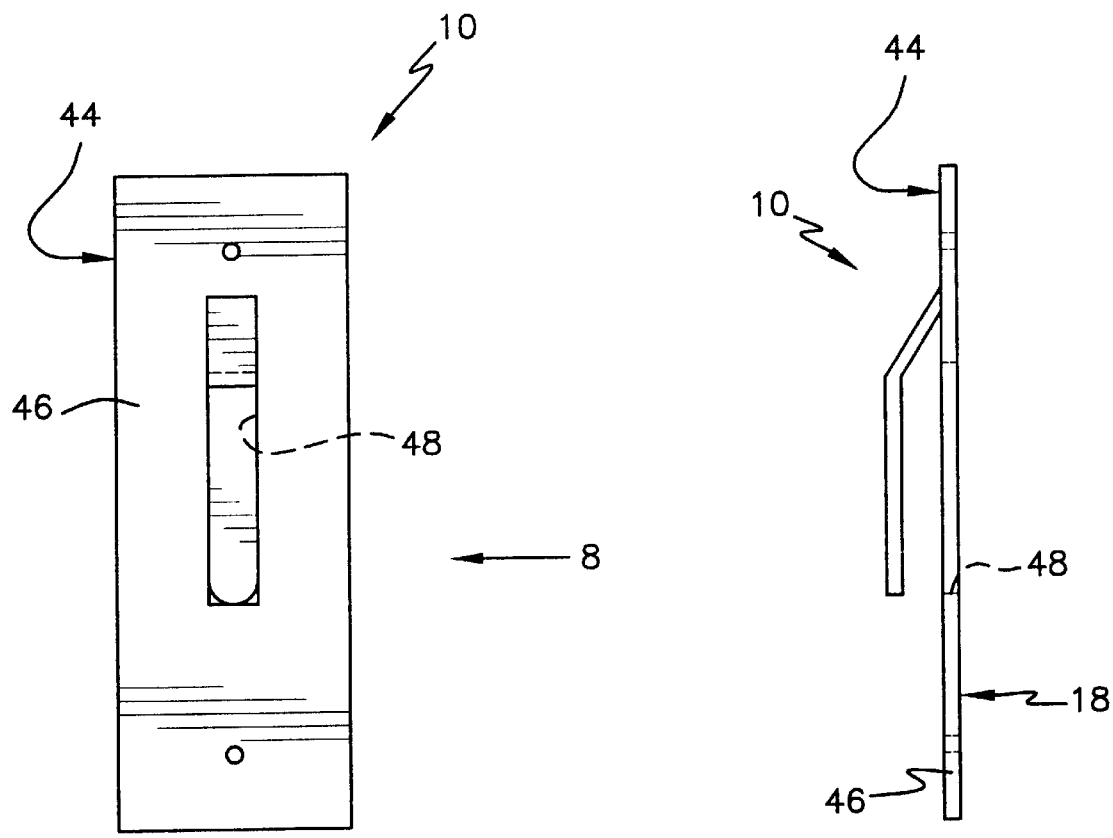
FIG. 7 is a front elevational view of the door hinge clip.
FIG. 8 is a side view taken in the direction of arrow 8 in FIG. 7.
Figure 9:
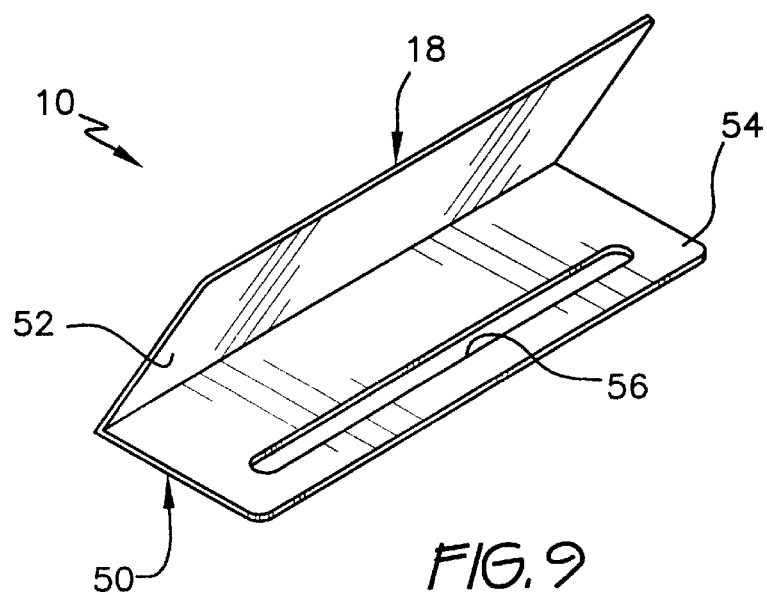
FIG. 9 is a perspective view of one of the window clips.

Securing means 18 can further include a door hinge clip 44, as shown in FIGS. 7 and 8, having a plate 46 with a slot 48. Door hinge clip 44 can engage with a hinge 47 of a front door 49 of the motor home 16 shown in FIG. 1, allowing angled hook end 40 of one hook plate 38 to engage with slot 48 in plate 46 of door hinge clip 44. Securing means 18 can also further include a window clip 50, as shown in FIG. 9, having an angled flange 52 and a plate 54 with a slot 56 therethrough. Angled flange 52 can engage with the location 21 being a side window molding 57 of the motor home 16, allowing angled hook end 40 of one hook plat 38 to engage with slot 56 in plate 54 of window clip 50.

Sun screen 12 in FIGS. 2 and 2A, is a new sun screen 12 being a flexible sheet 20 having a pocket 58 formed along each vertical edge 19. This pocket 58 is best seen in the cross sectional view in FIG. 2A. Securing means 18 includes the pair of anchor bars 22 having the series of spaced apart apertures 24. Each anchor bar 22 is positioned within one pocket 58 along one vertical edge 19 of flexible sheet 20. The pair of anchor straps 30 each have eyelet 32 on first end 33. Each nut 34 and bolt 36 can retain each eyelet 32 on each anchor strap 30 through midpoint aperture 24 on each anchor bar 22 through each pocket 58 of each flexible sheet 20. Each hook plate 38 has the angled hook end 40 and the pair of slots 42. The pair of slots 42 in each hook plate 38 can engage with free second end 43 of each anchor strap 30 with angled hook end 40 in engagement with the location 21 being a side window frame 45 of motor home 16.

INSTALLATION FOR EXISTING SUN SCREEN

Step 1; Hold anchor bar 22 over attached sun screen vertical edge 19 and select the highest reachable aperture 24 from ground and insert bolt 36 and nut 34. Repeat on other side of sun screen 12.

Step 2; Reposition anchor bar 22 along vertical edge 19 of sun screen 12 behind snaps. Center up and down and mark bottom hole 25 on sun screen 12. Repeat procedure on other side of sun screen 12.

Step 3; Remove entire sun screen 12 and pierce through sun screen 12 on marked hole 25 with awl 26 through bottom aperture 24 of anchor bar 22. Repeat procedure on other anchor bar 22 on other side of sun screen 12.

Step 4; Insert anchor pin 28 through hole 25 of sun screen 12, into bottom aperture 24 of anchor bar 22 and push through to lock in place.

Step 5; Line up anchor bar 12 parallel to sun screen vertical edge 19. Tighten and mark hole 25 in sun screen 12 through top aperture 24 of anchor bar 22. Repeat on other side of sun screen 12.

Step 6; Repeat steps 3 and 4 on all remaining apertures 24 of anchor bars 12 on both sides of sun screen 12, except aperture 24 with bolt 36 and nut 34.

Step 7; Reattach entire sun screen 12 on windshield 14 and fasten eyelet 32 on first end 33 of anchor strap 30 to aperture 24 with bolt 36 and nut 34. Repeat on other side.

Step 8; Select suitable anchor point locations 21 on both sides of sun screen 12 on window frame 45, door frame, or glass molding (use door hinge clip 44 or window clip 50). Slip open free second end 43 of anchor strap 30 through inner slot 42 of hook plate 38. Apply sufficient tension on anchor strap 30 and lock in place through other slot 42 in hook plate 38.

Step 9; Remove entire sun screen 12 and reattach by hooking one side or the other and rolling sun screen 12 along windshield 14 under wiper arms to anchor point location 21 on the opposite side.

Step 10; Position sun screen 12 evenly over windshield 14, check even tension on both sides and cut off excess free second ends 43 of anchor straps 30 with scissors.

This anchor system 10 is intended for existing and new motor home windshield sun screens 12. Since most motor home windshields 14 extend up to ten feet from the ground to top of glass, cumbersome and often dangerous snap and fasteners attaching to sides and top of windshield 14 by using ladders, stools, etc. will be totally eliminated with this new idea. Only one anchor strap 30 on each side of motor home 16 will be necessary and can be attached by a person standing on the ground.

On new sun screens 12, the pocket 21 on each side of sun screen 12 will support anchor bar 22, which makes edge of normally limber sun screen 12 stiff as a board. This will allow sun screen 12 to be rolled across windshield 14 under wiper arms to other side. All this is done by the person standing on the ground.

The series of anchor pins 28 are used to fasten existing sun screens 12 into prepunched anchor bar apertures 24 (conversion kit only). Location of anchor strap 30 on anchor bar 22 will be determined beforehand by as high as anchor strap 30 can be reached from the ground. Bolt 36 and nut 34 are then inserted in that location.

Anchor point locations on windows, window moldings or door can be selected later, as necessary clips and hardware for this step are included in package with instructions.

Promotional use of sun screen 12 could be provided with logos or names imprinted across sun screen 12 by stencil or template application. This would display a message in any campground or rally, even on dealership lots as a promotion. Sun screen 12 with dealers name like LAZYDAYS could be a thank you gift from the dealer to buyer of motor home 16 at time of contract signing.

It is to be understood that the present invention is not limited to the embodiments described above, but encompasses any and all embodiments within the scope of the following claims.

I claim:

1. An accessory for a motor home, the motor home having a windshield, a door, including a door frame, a window, including a window frame, the accessory comprising:
   a flexible sun screen having opposite vertical edges, each said vertical edge bearing a plurality of snaps; and
   securement means for securing each said vertical edge to the motor home, said securement means including
      a pair of stiff, straight anchor bars, each of said stiff straight anchor bars including a series of spaced apart apertures, and each said anchor bar extending substantially along the length of one of s aid vertical edges
      fastening pins for insertion through a plurality of said spaced apart apertures, leaving at least one of said spaced apart apertures unengaged, each of said fastening pins also extending through said flexible sun screen such that both of said stiff, straight anchor bars and a respective one of said vertical edges of said flexible sun screen are held in engagement with one another;
      a pair of anchor straps having a first end including an eyelet and a second free end;
      a pair of nuts and bolts, each said pair of nut and bolt being passing through said eyelet on said first end of each of said anchor straps, each said pair of nut and bolt also passing through said flexible sun screen and one of said unengaged spaced apart apertures in each of said stiff, straight anchor bars such that each of said first ends of said anchor straps is held in engagement with one of said stiff, straight anchor bars and its related vertical edge; and
      a pair of hook plates, each said hook plate having an angled hook end and a pair of slots, each of said pair of slots being arranged to engage said second free end of each of one of said anchor straps and said each angled hook end is engageable with a side window frame of the motor home; whereby
   said flexible sun screen is held over the windshield of the motor home and may be engaged therewith by a person standing on the ground.

2. The accessory according to claim 1, wherein said securement means further includes a door hinge clip having a plate with a slot, said door hinge clip being engageable with a door frame of the motor home and said slot is adapted to engage one said angled hook end of one said hook plate.

3. The accessory according to claim 1, wherein said securement means further includes a window frame clip having an angled flange and a plate with a slot, said window frame clip being engageable with a window frame of the motor home and said slot is adapted to engage one said angled hook end of one said hook plate.

4. An accessory for a motor home, the motor home having a windshield, a door, including a door frame, a window, including a window frame, the accessory comprising:
   a flexible sun screen having opposite vertical edges, each said vertical edge bearing a plurality of snaps, said each vertical edge including a pocket; and
   securement means for securing each said vertical edge to the motor home, said securement means including
      a pair of stiff, straight anchor bars, each of said stiff straight anchor bars being placed within one of said pockets and each said stiff straight anchor bar including a series of spaced apart apertures, and each said stiff straight anchor bar extending substantially along the length of one of said vertical edges;
      a pair of anchor straps having a first end including an eyelet and a second free end;
      a pair of nuts and bolts, each said pair of nut and bolt being passing through said eyelet on said first end of each of said anchor straps, each said pair of nut and bolt also passing through said flexible sun screen and one of said spaced apart apertures in each of said stiff, straight anchor bars such that each of said first ends of said anchor straps is held in engagement with one of said stiff, straight anchor bars and its related vertical edge; and
      a pair of hook plates, each said hook plate having an angled hook end and a pair of slots, each of said pair of slots being arranged to engage said second free end of each of one of said anchor straps and said each angled hook end is engageable with a side window frame of the motor home; whereby
   said flexible sun screen is held over the windshield of the motor home and may be engaged therewith by a person standing on the ground.

\* \* \* \* \*